US008554870B2

(12) United States Patent
Piccionelli

(10) Patent No.: US 8,554,870 B2
(45) Date of Patent: Oct. 8, 2013

(54) METHOD AND APPARATUS FOR GENERATING LINKING MEANS AND UPDATING TEXT FILES ON A WIDE AREA NETWORK

(76) Inventor: Gregory A. Piccionelli, Los Angeles, CA (US)

( * ) Notice: Subject to any disclaimer, the term of this patent is extended or adjusted under 35 U.S.C. 154(b) by 332 days.

(21) Appl. No.: 11/732,890

(22) Filed: Apr. 4, 2007

(65) Prior Publication Data

US 2007/0192510 A1 Aug. 16, 2007

Related U.S. Application Data

(63) Continuation of application No. 10/032,601, filed on Dec. 27, 2001.

(60) Provisional application No. 60/258,371, filed on Dec. 27, 2000.

(51) Int. Cl.
*G06F 15/16* (2006.01)

(52) U.S. Cl.
USPC .......................................... 709/217; 709/218

(58) Field of Classification Search
USPC ................................... 709/201–202, 217–219
See application file for complete search history.

(56) References Cited

U.S. PATENT DOCUMENTS

| | | | | |
|---|---|---|---|---|
| 4,225,918 A * | 9/1980 | Beadle et al. | ................. | 709/217 |
| 4,516,201 A * | 5/1985 | Warren et al. | ................. | 709/234 |
| 5,781,914 A * | 7/1998 | Stork et al. | .................... | 715/234 |
| 6,029,141 A * | 2/2000 | Bezos et al. | .................... | 705/27 |
| 6,070,158 A * | 5/2000 | Kirsch et al. | ..................... | 707/3 |
| 6,070,176 A * | 5/2000 | Downs et al. | ................. | 715/234 |
| 6,370,525 B1 * | 4/2002 | Kaufman | .......................... | 707/3 |
| 6,564,254 B1 * | 5/2003 | Shoji et al. | .................... | 709/217 |
| 6,694,307 B2 * | 2/2004 | Julien | ............................... | 707/3 |
| 6,922,699 B2 * | 7/2005 | Schuetze et al. | .............. | 709/203 |
| 7,013,298 B1 * | 3/2006 | De La Huerga | ............. | 709/217 |
| 7,319,975 B2 * | 1/2008 | Monteverde | .................... | 705/14 |
| 7,421,432 B1 * | 9/2008 | Hoelzle et al. | ................ | 709/217 |
| 2002/0059333 A1 * | 5/2002 | Tribbeck | ........................ | 707/500 |
| 2005/0235031 A1 * | 10/2005 | Schneider et al. | ............ | 709/203 |
| 2008/0016142 A1 * | 1/2008 | Schneider | ..................... | 709/203 |

* cited by examiner

*Primary Examiner* — Minh-Chau Nguyen

(57) ABSTRACT

Embodiments of the instant invention are directed to methods for automatically generating a link in E-mail, web pages and other documents and files presented to users of wide area computer networks, and for automatically updating text and other types of files on a wide area network with links to data desired to be presented to such users. In embodiments of the present invention, selected key words are stored in a memory location or key word file. A comparison is made between the words in a downloaded text file and the key words stored in the key word file. If a word is detected in the textual data and the key word file or files, the key word displayed to the user is converted into a link.

17 Claims, 5 Drawing Sheets

410
Download document including digital data corresponding to at least one graphic, audio, video or executable file or combination thereof

420
Identify portion of digital data discernable by user and corresponding to at least one word, graphic file, audio file, video file, executable file or combination thereof as key word

430
Store key word in key word file

440
Associate key word with linking means, linking means being associated with predefined data

450
Compare digital data in document with key word in key word file

460
Insert linking means into digital data file at location corresponding to key word

METHOD AND APPARATUS FOR GENERATING LINKING MEANS AND UPDATING TEXT FILES ON A WIDE AREA NETWORK

This application is a continuation of U.S. patent application Ser. No. 10/032,601, filed Dec. 27, 2001, which in turn was based on U.S. Provisional Patent Application Ser. No. 60/258,371, filed Dec. 27, 2000, the entire disclosures of each of which are incorporated herein by reference.

FIELD OF THE INVENTION

The present invention is directed to a system, method and apparatus for automatically generating linking means and updating text files. More specifically, embodiments of the invention are directed to a method and apparatus for generating a link means within a document or file that allows users to link with selected data, wherein the documents and files are automatically updated with the linking means.

BACKGROUND OF THE INVENTION

Communication via wide area networks ("WANS"), such as, for example, through the Internet, has become an increasingly common manner of communication world wide. Additionally, because of the millions of persons using electronic mail ("E-mail") or the World Wide Web ("WWW"), wide area computer networks, have become a very useful tool for inexpensively marketing and advertising goods and services. As such, it is highly desirable for many persons and companies to make messages, such as advertisements, available to persons using WANS. As a result of the efforts of such persons and companies, users of Internet-based electronic mail or the WWW are inundated with a huge and steadily increasing amount of information.

Some of the information provided by persons and companies attempting to attract the attention of Internet users employ the transmissions of mass unsolicited e-mail or "spam" sent to large numbers of persons using the Internet. This practice has become increasingly problematic as it consumes limited Internet bandwidth and server resources of Internet Service Providers ("ISP"). It is also often undesired by the recipient. In fact, concerns over the use of unsolicited E-mail as a means of advertising has resulted in the passage of may laws restricting the transmission of mass unsolicited E-mail. Persons and companies desiring the attention of persons using the Internet must, therefore, confront the increasingly difficult task of effectively, unobtrusively and legally drawing Internet user's attention to their message, such as an advertisement, amid the flood of Internet information.

One popular means of transmitting information on the WWW is via web sites, comprised of one or more web pages using hypertext markup language ("HTML"). In most instances, in addition to the textual, graphic, and/or audio data presented on each page, additional data is embedded into each page via hyperlinks. A hyperlink is a means by which a user can be quickly directed to another web site, web page or other file containing information by the downloading of such information in response to the user's execution of the command embedded in the hyperlink.

A hyperlink can be presented to a user as a work, a graphic, sound, audiovisual or similar matter displayed via a web browser such as Netscape, Internet Explorer or similar graphic user interface. Typically, the hyperlinks found on a web page are created at the time that the web page is created such that the web page is presented to the user including the hyperlinks. If additional hyperlinks are later desired, the person managing the web page must return to the web page to insert the later desired link. If multiple web pages require the newly desired link, a hyperlink must be created on each page for the link to work for that page. This manner of creating and updating hyperlinks on individual web pages is time consuming and further, can be ineffective as the person updating the pages may not update all the relevant pages or sites. A need in the industry exists for automatically generating a link means and updating the presentation of web sites, or web pages, to users with such updated link means. Additionally, a need in the industry exists for persons and companies to automatically present to persons using wide area computer networks, such as the Internet, a linking means to messages such as advertisements.

SUMMARY OF THE DISCLOSURE

Embodiments of the instant invention are directed to methods for automatically generating a link means in files presented to users of wide area computer networks, and for automatically updating text and other types of files on a wide area network with linking means to data desired to be presented to such users. In embodiments of the instant invention, selected key words are stored in a memory location or key word file. In preferred embodiments, each key word is associated with information, such as a web page, to which the advertiser, for example, desires the user to be able to link.

The key word file is transmitted to the user, either automatically or upon request. In some embodiments the key word file is transmitted to the wide area computer network user's computer without any notice to the user. A key word comparison and word to hypertext transformation program ("HTP") enabling the user's computer to perform certain functions is also transmitted to the user's computer with the key word file.

When textual data is downloaded from a network or memory storage device to a user's computer, a comparison is made between the words in the downloaded text and the key words stored in the key word file or key word data memory location by the HTP to determine the presence of key words in the document. If a word is detected in the textual data and the key word file or files, the key word displayed to the user is converted into a linking means. In one embodiment, the key word is converted into a hyperlink and the document is updated to reflect the newly-generated hyperlinks. When the hyperlink in a document is selected, the user's browser, or other similar wide area network interface, displays the corresponding web page or downloads a corresponding file.

A feature of preferred embodiments of the invention is the immediate conversion of key words to hyperlinks in a document. An advantage of this feature is that it allows linkage of the user to the information coupled to the key word.

A further feature of preferred embodiments of the invention is the ability for advertisers to market their goods and services in real time without interrupting the consumer. An advantage to this feature is that consumers voluntarily access the information and thus, are more likely to purchase or utilize the advertised information.

The above and other features and advantages of embodiments of this invention will be apparent from the following more detailed description when taken in conjunction with the accompanying drawings of illustrative embodiments.

BRIEF DESCRIPTION OF THE DRAWINGS

The detailed description of embodiments of the invention will be made with reference to the accompanying drawings, wherein like numerals designate corresponding parts in the figures.

FIG. 5 is a flow chart illustrating an embodiment of another method according to the instant invention for converting digital data in a data document into a linking means.

DETAILED DESCRIPTION OF PREFERRED EMBODIMENTS

Embodiments of the instant invention are directed to a system, method and apparatus for generating linking means and updating files on a network. Embodiments of the instant invention employ a network of computers and programs for retrieving and displaying data and files to users on a wide area network, such as, the WWW or the Internet.

Figure 1:
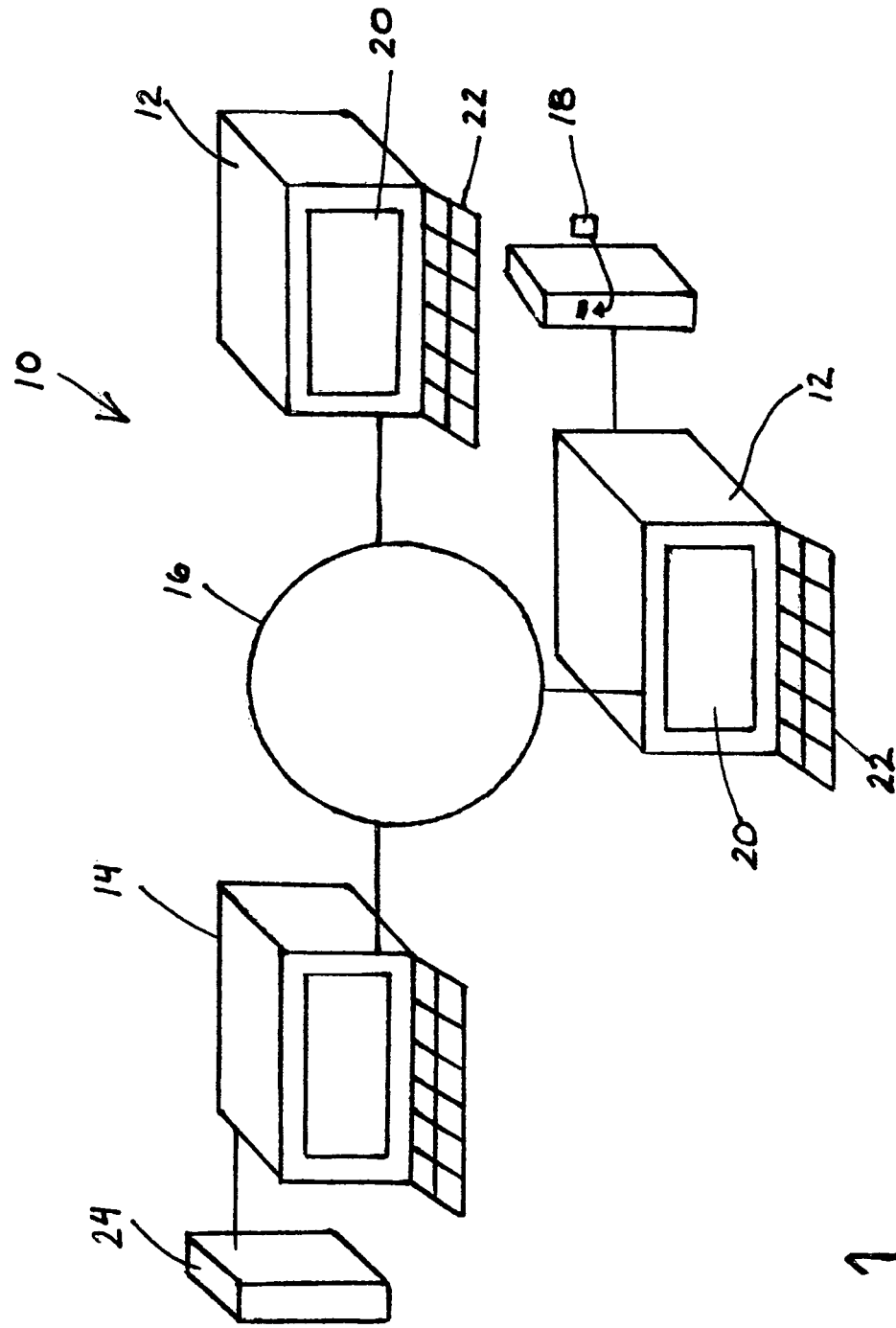
FIG. 1 is a network system environment in accordance with a preferred embodiment of the instant invention.

Hardware Environment:

Preferred embodiments of the instant invention operate with a network comprising a plurality of networked computers, such as, for example, at least one user computer and at least one provider computer which are coupled together in a communications network, such as, for example, the Internet or WWW. FIG. 1 depicts a simplified representation of an example network system 10 that is operated in accordance with preferred embodiments of the invention.

The network system 10 includes at least two client or user computers 12 and at least one provider computer 14 coupled for communication therebetween, generally represented at 16. In the illustrated embodiment, two client or user computers 12 and one provider computer 14 is shown in the network system. It will be understood that further embodiments may employ any suitable number of user and provider computers. The network system 10 may comprise a closed or intranet configuration, an open or public-access network configuration or combinations of such configurations, as is well known in the art. For example, the user and provider computers 12 and 14 may be included in smaller, interconnected networks which compose the overall network system 10. In an Internet embodiment, the network system 10 comprises a combination of a large number of interconnected internets and intranets. For purposes of simplifying the present disclosure, the various hardware components (for example, host servers, routers, connectors) and software necessary for communication between computers on the network system are not described herein in detail. Such hardware and software are well within the scope of one of ordinary skill in the art and are at least partially dependent upon the type of network system employed and the desired application of use.

The user computer 12 may comprise any suitable network device capable of communicating with other network devices in the network system. In preferred embodiments, the user computer 12 comprises a programmable processor capable of operating in accordance with programs stored on one or more computer readable media 18 (for example, but not limited to floppy disc, hard disc, computer network, random access memory (RAM), CD Rom, or the like), a display device 20 for providing a user-perceivable display (for example, but not limited to visual displays, such as cathode ray tube CRT displays, light-emitting-diode LED or liquid-crystal-diode LCD displays, plasma displays or the like, audio displays or tactile displays), and a user input device 22 (for example, but not limited to, a keyboard, mouse, microphone, or the like). In one preferred embodiment, the user computer comprises a personal computer system having a CRT display, a keyboard and a mouse user-input device.

The user computer 12 is controlled by suitable software, including network communication and browser software to allow a user to request, receive and display information (or content) from or through a referral provider computer 14 on the network system 10. In preferred embodiments, the user computer 12 employs a program, such as a browser, for displaying content received from a referral provider computer 14.

The provider computer 14 may comprise any suitable network device capable of providing content (data representing text, hypertext, photographs, graphics video and/or audio) for communication over the network. In preferred embodiments, the referral provider computer 14 comprises a programmable processor capable of operating in accordance with programs stored on one or more computer readable media 24 (for example, but not limited to, floppy disks, hard disks, random access memory RAM, CD-ROM), to provide content for communication to a user computer 12. The referral provider computer may comprise, for example, but is not limited to, a personal computer, a mainframe computer, network computer, portable computer, personal data assistant (such as, a 3Com Palm Pilot), or the like. The referral provider computer 14 may include one or more internal data storage devices (not shown) for storing content for communication to a user computer 12. Alternatively, or in addition, the provider computer 14 may be coupled to an external data storage device, computer or other means (not shown) from which the referral provider computer 14 may obtain content for communication to a user computer 12. In one embodiment, the external device may comprise a further network device coupled in the network 16.

General Description of Preferred Embodiments

Embodiments of the instant invention are directed to methods for automatically generating a link means in E-mail, web pages and other documents and files presented to users of wide area computer networks, and for automatically updating text and other types of files on a wide area network with linking means to data desired to be presented to such users. In embodiments of the instant invention, selected key words are stored in a memory location or key word file. In some embodiments, the key words are determined by advertisers that pay to have their key word included in the key word list or file. In preferred embodiments, each key word is associated with information, such as a web page, to which the advertiser, for example, desires the user to be able to link.

In some embodiments of the instant invention, the key word file is automatically transmitted to memory storage locations on the computers of users of the Internet upon accessing the servers of their ISP at the time the users log into the Internet or when they access the servers of selected web sites. In some embodiments, the key word file may reside only on remote computers and only a small locator data script indicating a file location accessible on a wide area computer network, such as the Internet, is downloaded to the user's computer via their ISP's server or one or more servers corresponding to web sites at which the key word file may be obtained. In other embodiments, multiple key word files are transmitted to the user's computer. In some embodiments, the user must elect, via a click-through mechanism or other means to download the key word file to the user's computer. In some embodiments the key word file is transmitted to the wide area computer network user's computer without any notice to the user.

In some embodiments, a key word comparison and word to hypertext transformation program ("HTP") enabling the user's computer to perform certain functions of the instant invention is also transmitted to the user's computer with the key word file. Such transmission may be accomplished by any of the foregoing means of transmission of the key word file. In some preferred embodiments, a locator data script indicating a file location accessible on a wide area computer network, such as the Internet, is downloaded to the user's computer via their ISP's server or one or more servers corresponding to web sites at which access to the HTP may be obtained by the user computer as required to perform the instant invention.

In some embodiments of the instant invention, when textual data is downloaded from a network or memory storage device to a user's computer, a comparison is made between the words in the downloaded text and the key words stored in the key word file or key word data memory location by the HTP for the purpose of detecting the presence of key words in the document. In some embodiments, multiple key word files are used, and thus, the comparison between the textual data is made with multiple key word files. The comparison between the textual data and the key word file is conducted via the HTP. While, in some embodiments, the HTP is written in Java™ or Active XT™, any suitable software language may be employed.

FIG. 5 illustrates an embodiment of a method according to the instant invention adapted for practice with documents including graphic, video, audio and/or executable files. A document including digital data corresponding to at least one graphic, audio, video or executable file, or combination thereof, is initially downloaded to a users computer (step 410). A portion of the digital data, discernable by a user and corresponding to at least one word, graphic file, audio file, video file, executable file or combination thereof, is identified as a key word (step 420), and this key word is then stored in a key word file (step 430). The key word is associated with a linking means (step 440) associated with predefined data. Then, the digital data in the document are compared with the key word in the key word file (step 450), and the associated linking means are inserted into the digital data file at a location corresponding to the key word (step 460).

If a word is detected in the textual data and the key word file or files, the key word displayed to the user is converted into a linking means. In one embodiment, the key word is converted into a hyperlink. Thus, after the user downloads the document, hyperlinks are generated in accordance with the key word files and the document is updated to reflect the newly-generated hyperlinks.

When such a hyperlink in a document is selected, the user's browser, or other similar wide area network interface, displays the corresponding web page or downloads a corresponding file.

In some embodiments, some or all the key words have been selected as part of an advertising process wherein a company or person has paid a fee or other consideration to have selected words, such as a company name, product, service, or other communication symbol, sound or other sensory communication, included in the keyword data memory location. In this way a key word detected in an E-mail message or web page accessed by the user is converted to a hyperlink every time the word is detected. When selected by a user, the hyperlink will allow the linkage of the user's browser to a site or downloading a file desired by the company, such as the company's web site or an advertising web page or file. In some preferred embodiments the selection of the hyperlink results in the presentation of an advertisement or commercial.

In some embodiments, the data document downloaded comprises graphic, audio, video, and/or executable files, such as robotic command, olfactory or tactile stimulation device command data, in whole or part. The key words, in this instance, comprise user discernable words, graphics, or other communication means corresponding to the graphic, tactile, or olfactory information words or sounds contained in the audio or visual data in the graphic, audio, video, and other suitable data means. When the digital data corresponding to the sound, such as a spoken word or other sound corresponds to digital data in the key word memory, a hyperlink triggerable by conventional mouse clicking, audio command, or other user interface means, is created.

Although the foregoing described the invention with embodiments having particular forms that have been illustrated and described, this is not intended to limit the invention. For instance, although preferred embodiments have been described with reference to a wide area network, it is to be understood that embodiments of the invention are also applicable on other networks, including, but not limited to, a local network, an intranet and an internet. Indeed, the foregoing is intended to cover all modifications and alternative constructions falling within the spirit and scope of the invention as expressed in the appended claims.

Figure 2:
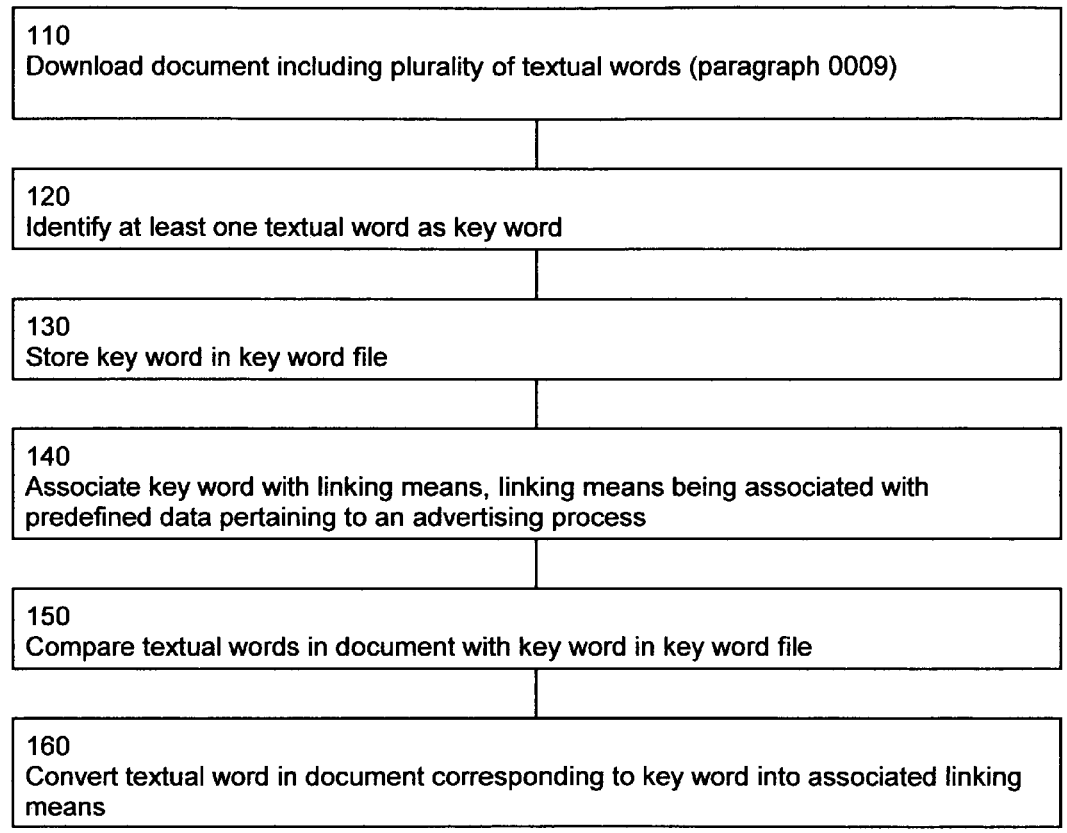
FIG. 2 is a flow chart illustrating an embodiment of a method according to the instant invention.

FIG. 2 presents a flow chart illustrating an exemplary embodiment of a method according to the instant invention. A document is initially downloaded to a user's computer (step 110). The downloaded document includes a number of textual words. In the next step, at least one of the textual words of the document is identified as a key word (step 120), and this key word is then stored in a key word file (step 130). The key word is associated with a linking means (step 140), for example, a hyperlink. These linking means are associated with predefined data pertaining to an advertising process, for example, a web page. Then, the textual words in the document are compared with the key word in the key word file (step 150), and the textual words in the document corresponding to the key word are then converted into the associated linking means (step 160).

Figure 3:
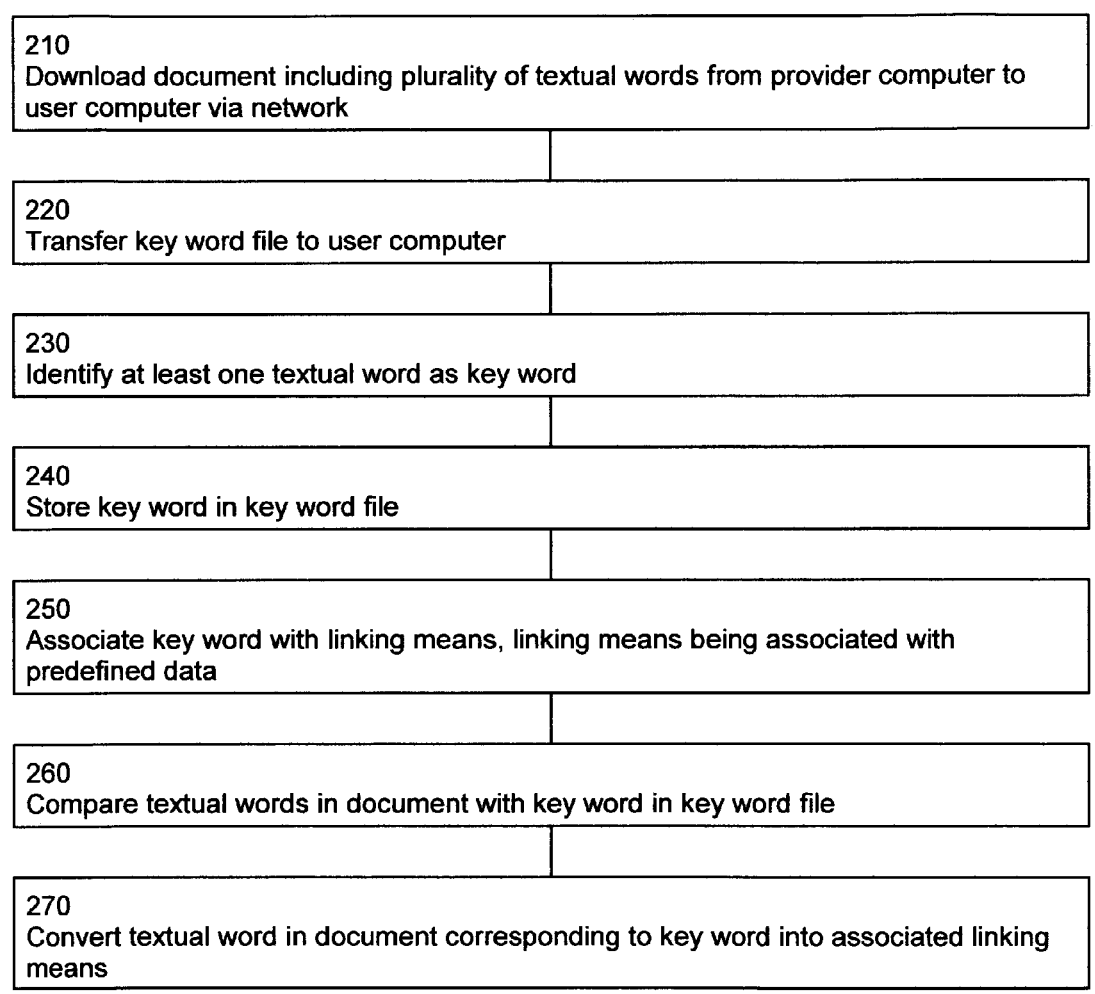
FIG. 3 is a flow chart illustrating a more particular embodiment of a method according to the instant invention which is performed on a network having a provider computer and a user computer.

Turning to FIG. 3, a more particular embodiment of a method according to the instant invention is performed on a computer network having a provider computer and a user computer. A document is initially downloaded to a user's computer via the network (step 210). A key word file is also transferred to the user's computer (step 220). The downloaded document includes a number of textual words, and at least one of the textual words of the document is identified as a key word (step 230) which is then stored in a key word file (step 240). The key word is associated with a linking means (step 250), as with the preceding embodiment. Then, the textual words in the document are compared with the key word in the key word file (step 260), and the textual words in the document corresponding to the key word are then converted into the associated linking means (step 270).

Figure 4:
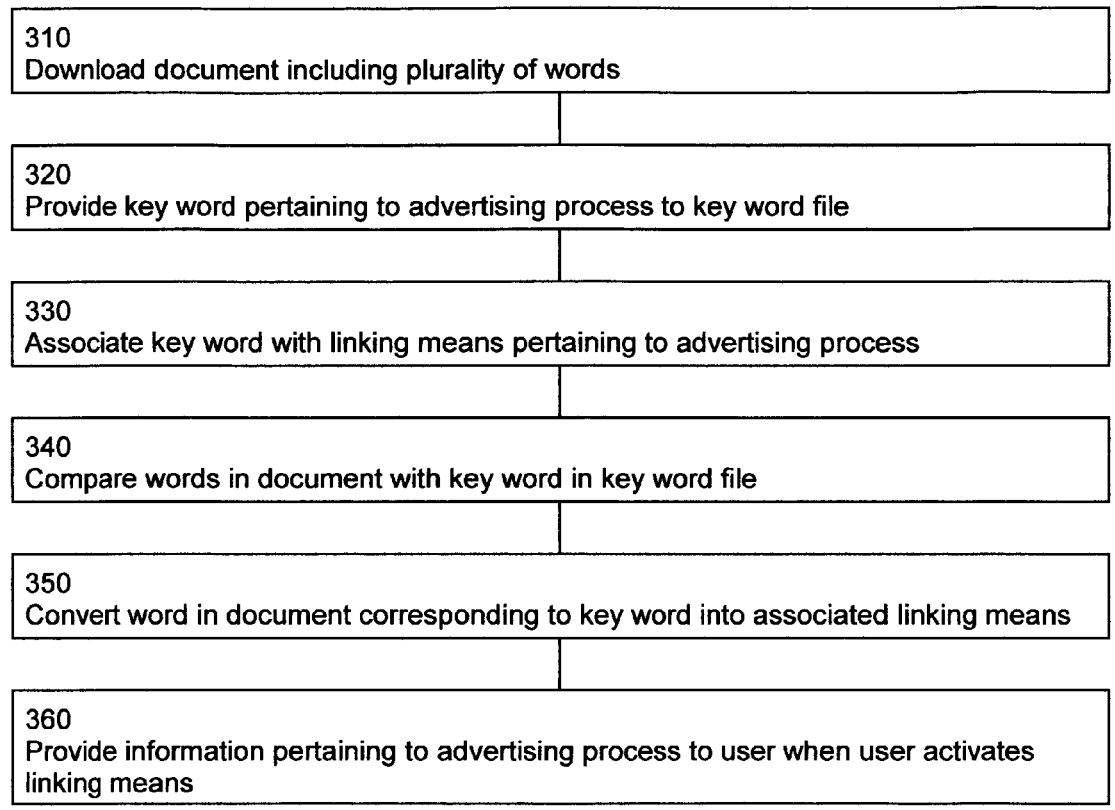
FIG. 4 is a flow chart illustrating an embodiment of another method according to the instant invention for providing information pertaining to an advertising process to a user.

An alternative embodiment of a method according to the instant invention that provides advertising information is illustrated in FIG. 4. Similarly to preceding embodiments, a document is initially downloaded to a user's computer (step 310). The downloaded document includes a number of words, for example textual words. In the next step, a key word pertaining to an advertising process is provided to a key word file (step 320). The key word is associated with a linking means pertaining to an advertising process (step 330), for example, a hyperlink. In particular embodiments, a premium is paid to provide the key word to the key word file. The words in the document are then compared with the key word in the key word file (step 340), and the words in the document corresponding to the key word are then converted into the associated linking means (step 350). Finally, information pertaining to the advertising process is provided to a user who activates the linking means (step 360), for example in using a user computer.

What is claimed is:

1. A method for converting, at a client computer in communication with the Internet, a textual word in a document, received from the Internet, having a plurality of textual words, into a linking means directed to information pertaining to an advertising process remote from the client computer, the method comprising:
    identifying at least one textual word as a key word pertaining to the advertising process;
    storing the key word in a key word file;
    associating the key word with the linking means, wherein the linking means is associated with predefined data pertaining to the advertising process;
    receiving, at the client computer, a file related to the key word file via the Internet;
    comparing, at the client computer, the textual words in the document received from the Internet with the key word in the key word file; and
    converting the textual word in the document received from the Internet into the linking means corresponding to the key word.

2. The method of claim 1, wherein the document received from the Internet is an E-mail document, web page, or other file presented to a user computer via the Internet.

3. The method of claim 2, wherein the file related to the key word file is either the key word file or a locator data script file that indicates the key word file location remote from the client computer.

4. The method of claim 3, wherein key word file is remote to the client computer.

5. The method of claim 1, wherein the linking means is a hyperlink.

6. A method for generating linking means to information pertaining to an advertising process, the method comprising:
    identifying a key word pertaining to the advertising process, where the key word is a textual word;
    storing the key word in a key word file;
    associating the key word with the linking means, where the linking means is associated with predefined data pertaining to the advertising process;
    transmitting a file related to the key word file to a client computer; and
    transmitting a key word comparison and word to hypertext transformation program ("HTP") to the client computer, where the HTP is configured to
        compare a textual word in a document, received at the client computer from the Internet, having a plurality of textual words with the key word in the key word file, and
        convert the textual word in the document received from the Internet into the linking means corresponding to the key word.

7. The method of claim 6, wherein the document, received from the Internet, is an E-mail document, web page, or other file presented to a user computer via the Internet.

8. The method of claim 7, wherein the file related to the key word file is either the key word file or a locator data script file that indicates the key word file location remote from the client computer.

9. The method of claim 8, wherein key word file is remote to the client computer.

10. The method of claim 8, wherein both transmitting the file related to key word file and transmitting the HTP happen either simultaneously or approximately simultaneously.

11. The method of claim 6, wherein the linking means is a hyperlink.

12. A method for generating linking means to information pertaining to an advertising process, the method comprising:
    receiving a file related to a key word file having at least one key word;
    receiving a key word comparison and word to hypertext transformation program ("HTP");
    receiving a document from the Internet having a plurality of textual words;
    comparing the plurality of textual words in the received document with the at least one key word in the key word file; and
    converting the textual word to the linking means corresponding to the at least one key word, wherein
        the at least one key word is a textual word that pertains to the advertising process,
        the at least one key word is also associated with the linking means, and
        the linking means is associated with predefined data pertaining to the advertising process.

13. The method of claim 12, wherein the document, received from the Internet, is an E-mail document, web page, or other file presented to a user computer via the Internet.

14. The method of claim 13, wherein the file related to the key word file is either the key word file or a locator data script file that indicates the key word file location remote from the client computer.

15. The method of claim 14, wherein key word file is remote to the client computer.

16. The method of claim 12, wherein the linking means is a hyperlink.

17. The method of claim 12, wherein both receiving the file related to key word file and receiving the HTP happen either simultaneously or approximately simultaneously.

* * * * *